United States Patent [19]

Allen

[11] 4,429,221
[45] Jan. 31, 1984

[54] METHOD FOR DETERMINING FLUID SATURATION CHARACTERISTICS OF SUBSURFACE FORMATIONS

[75] Inventor: Linus S. Allen, Dallas, Tex.

[73] Assignee: Mobil Oil Corporation, New York, N.Y.

[21] Appl. No.: 295,917

[22] Filed: Aug. 24, 1981

[51] Int. Cl.³ ............................................. G01V 5/00
[52] U.S. Cl. .................................... 250/256; 250/259
[58] Field of Search ..................... 250/253, 256, 259; 73/152

[56] References Cited

U.S. PATENT DOCUMENTS 3,628,011 12/1971 Wyman ............................... 250/43.5
3,748,474 7/1973 Murphy ............................... 250/83.3
3,757,575 9/1973 Murphy et al. ........................ 73/152
3,783,683 1/1974 Murphy et al. ........................ 73/152
3,812,353 10/1974 Gilchrist ............................. 250/83.3
3,825,752 7/1974 Murphy et al. ...................... 250/258

Primary Examiner—Janice A. Howell
Attorney, Agent, or Firm—Alexander J. McKillop; James F. Powers, Jr.; George W. Hager, Jr.

[57] ABSTRACT

Thermal neutron capture logs obtained during a log-inject-log operation and utilized in the determination of the water saturation condition of a formation traversed by a borehole are corrected for neutron diffusion and borehole effects by a normalization factor relating the apparent and measured macroscopic absorption cross sections of the rock matrix in the formation.

5 Claims, No Drawings

METHOD FOR DETERMINING FLUID SATURATION CHARACTERISTICS OF SUBSURFACE FORMATIONS

BACKGROUND OF THE INVENTION

This invention relates to radioactive well logging and more particularly to an improved method for determining the fluid saturation characteristics of subsurface formations surrounding a borehole from pulsed neutron capture logs which have been recorded by the log-inject-log technique.

Theoretically, the hydrocarbon and water saturations of a subsurface formation can be represented by the following expression:

$$\Sigma_{formation} = \Sigma_{rock}(1-\phi) + \Sigma_{fluid}\phi \quad (1)$$

$$\Sigma_{fluid} = \Sigma_{oil}S_{oil} + \Sigma_{water}S_{water} \quad (2)$$

$$S_{oil} = 1 - S_{water} \quad (3)$$

where,
$\Sigma$ represents macroscopic absorption cross section,
S represents saturation (or volume fraction of a particular fluid in place), and
$\phi$ represents porosity.

In rewriting equation (1) in terms of equations (2) and (3), the macroscopic thermal neutron absorption cross section of the formation can be written:

$$\Sigma_f = (1-\phi)\Sigma_r + \phi[S_w\Sigma_w + \Sigma_h(1-S_w)] \quad (4)$$

Of the five variables on the right-hand side of equation (4) required for the determination of hydrocarbon saturation, the macroscopic absorption cross sections of rock matrix ($\Sigma_r$), hydrocarbon ($\Sigma_h$), and water ($\Sigma_w$) are known or estimatable, while the porosity ($\phi$) and macroscopic absorption cross section of the formation ($\Sigma_f$) must be measured within the borehole.

In many instances the macroscopic absorption cross section of the rock matrix ($\Sigma_r$) cannot be known or estimated with good accuracy. Strongly absorbing trace elements are usually too abundant in the rock matrix to permit an accurate determination of $\Sigma_r$ from the rock's major constituents. The log-inject-log technique has been utilized to overcome this problem. The formation is first flushed with a brine of known salinity and therefore known macroscopic absorption cross section $\Sigma_{w1}$. A pulsed neutron capture log is then recorded. The formation is thereafter flushed with a brine of different salinity and cross section $\Sigma_{w2}$. A second pulsed neutron capture log is recorded. If both flushings are sufficient to achieve residual hydrocarbon saturation in all zones of interest, then the logged cross sections, $\Sigma_{log\ 1}$ and $\Sigma_{log\ 2}$ can be written:

$$\Sigma_{log\ 1} = (1-\phi)\Sigma_r + \phi[S_w\Sigma_{w1} + \Sigma_h(1-S_w)] \quad (5)$$

and $$\Sigma_{log\ 2} = (1-\phi)\Sigma_r + \phi[S_w\Sigma_{w2} + \Sigma_h(1-S_w)] \quad (6)$$

Subtracting equation (3) from equation (1) yields:

$$\phi S_w = (\Sigma_{log\ 1} - \Sigma_{log\ 2})/(\Sigma_{w1} - \Sigma_{w2}) \quad (7)$$

Equation (7) is the conventional log-inject-log expression. With porosity and water macroscopic cross-sections known or measured, the recordings of $\Sigma_{log\ 1}$ and $\Sigma_{log\ 2}$ will allow the computations of water saturation corresponding to residual oil saturation, independent of $\Sigma_r$.

For a more detailed understanding of the log-inject-log technique reference may be had to U.S. Pat. Nos. 3,748,474; 3,757,575; 3,812,353; and 3,825,752.

Various logging tools are available in the art for measuring thermal neutron capture cross section as a function of depth within the borehole. One such tool is the pulsed neutron logging tool. This tool provides a pulsed neutron log indicative of the time required or the rate at which thermal neutrons emitted by the tool are captured or absorbed by the formation material. This log indicates the macroscopic absorption cross section of the formation, referred to in the well logging art as the thermal neutron capture cross section. One such pulsed neutron log is provided by Schlumberger, Limited of New York, New York under the tradename THERMAL DECAY TIME LOG. Another such pulsed neutron log is provided by Dresser Industries, Inc. of Houston, Texas, under the tradename NEUTRON LIFETIME LOG.

SUMMARY OF THE INVENTION

The present invention is directed toward a method for determining fluid saturation of a subsurface formation. More particularly, a log-inject-log operation is carried out in a subsurface formation traversed by a borehole to determine the apparent water saturation condition. Firstly, the formation is flushed with a first fluid of known macroscopic absorption cross-section and a pulsed neutron capture log is recorded of the flushed formation. Secondly, the formation is flushed with a second fluid of known macroscopic absorption cross section and a pulsed neutron capture log is recorded of the flushed formation. The formation porosity is also measured. From the foregoing measurements the apparent water saturation of the formation is determined. This determination is not a true representation of water saturation as it reflects both formation neutron diffusion effects and certain borehole effects, such as borehole size, borehole liquid salinity, casing weight, cement or multiple pipe strings. It is therefore a specific feature of the present invention to correct the apparent water saturation by utilizing measured rock matrix cross sections to normalize the pulsed neutron capture logs for such neutron diffusion and borehole effects.

Normalization is carried out in the following manner. The macroscopic absorption cross-section of the hydrocarbon in the formation is measured and the apparent macroscopic absorption cross section of the rock matrix in the formation is determined from the measurements of apparent water saturation and macroscopic absorption cross section of the hydrocarbon. The real macroscopic absorption cross section of the rock matrix is also measured and a normalization factor between the measured and apparent macroscopic absorption cross sections of the rock matrix is determined. Finally, the apparent water saturation is corrected by such normalization factor to provide for a normalized water saturation.

DESCRIPTION OF THE PREFERRED EMBODIMENT

In accordance with the present invention, there is provided a new and improved method for determining the fluid saturation characteristics of a subsurface formation from a log-inject-log operation. The method utilizes measured rock matrix absorption cross sections to normalize pulsed neutron capture logs for inaccuracies arising from such factors as neutron diffusion effects and borehole effects such as borehole size, borehole liquid salinity, casing weight, cement, or multiple strings of pipe in the borehole.

Frequently the only subsurface zone where water saturation is known with any degree of accuracy is a zone containing no hydrocarbons. In such a zone the water saturation can be expected to be equal to 1. For this zone the log-inject-log expression is as follows:

$$\Sigma_{log\ 1} - \Sigma_{log\ 2} = \phi(\Sigma_{w1} - \Sigma_{w2}) \quad (8)$$

If this expression is not satisfied, a normalization factor (k) is applied as follows:

$$\Sigma_{log}^* = k\Sigma_{log} \quad (9)$$

where $$\Sigma_{log\ 1}^* - \Sigma_{log\ 2}^* = \phi(\Sigma_{w1} - \Sigma_{w2}) \quad (10)$$

in the subsurface zone for which water saturation is equal to 1. From the foregoing, the normalized water saturation is given by the following expression:

$$S_w^* = kS_w \quad (11)$$

This expression for normalized water saturation is valid when the error in $\Sigma_{log}$ is proportional to $\Sigma_{log}$ because the hydrocarbon-bearing zones will have different values of $\Sigma_{log}$ than the zones where $\Sigma_{log}$ is normalized. To provide for a normalization which does not require the existence of a zone of known water saturation and which uses only the logged macroscopic absorption cross sections, the present invention provides for a normalization technique based upon measured rock matrix cross sections. Assuming that the residual error in $\Sigma_{log}$ after all conventional corrections have been applied can be corrected by equation (9), the following expression results:

$$\Sigma_r^*(1-\phi) + \phi[S_w^*\Sigma_w + (1-S_w^*)\Sigma_h] = k\{\Sigma_r(1-\phi) + \phi[S_w w + (1-S_w)\Sigma_h]\} \quad (12)$$

where $\Sigma_r^*$ is the measured rock matrix cross section and $\Sigma_r$ is the apparent rock matrix cross section determined from the expression:

$$\Sigma_r = \Sigma_{log} - \phi[S_w\Sigma_w + (1-S_w)\Sigma_h]/(1-\phi) \quad (13)$$

The apparent water saturation $S_w$ is determined from equation (7). Therefore equations (12) and (13) apply whether $\Sigma_{log\ 1}$ and $\Sigma_{w1}$ are involved or whether $\Sigma_{log\ 2}$ and $\Sigma_{w2}$ are involved. Utilizing equation (11) for normalized water saturation in equation (12), the following expression is derived:

$$k = [\Sigma_r^*(1-\phi) + \Sigma_h\phi]/[\Sigma_r(1-\phi) + \Sigma_h\phi], \quad (14)$$

which is the relationship for the desired normalization factor in terms of the measured rock matrix cross sections. With this normalization factor determined for each zone having a measured rock matrix cross section, the normalization factor can be utilized to obtain a corrected water saturation for each such zone in accordance with equation (11). Alternatively, an average normalization factor can be determined for several zone intervals and the average factor utilized to determine the desired corrections.

In a further aspect of the invention, normalization may take into account any linear deviation between the apparent rock matrix cross section determined from the thermal neutron capture logs and the measured rock matrix cross section. Such linear deviation may be termed zero offset as represented by the symbol B in the expression:

$$Y = AX + B \quad (15)$$

where Y is the apparent rock matrix cross section values, and X is the measured rock matrix cross section values. In this case equation (9) is reexpressed as follows:

$$\Sigma_{log}^* = k(\Sigma_{log} + \Delta\Sigma) \quad (16)$$

where $\Delta\Sigma$ is the correction factor for zero offset. Accordingly equation (14) is reexpressed as follows:

$$k = [\Sigma_r^*(1-\phi) + \phi\Sigma_h - \Delta\Sigma]/[\Sigma_r(1-\phi) + \phi\Sigma_h] \quad (17)$$

In order to determine the normalization factor (k) in accordance with equation (17), two measured rock matrix cross sections $\Sigma_r^*$ must be obtained instead of one and these measured rock matrix cross sections must correspond to core samples with different rock porosities.

It is to be understood that various modifications to the disclosed embodiment, as well as alternative embodiments, may become apparent to one skilled in the art without departing from the scope and spirit of the invention as hereinafter defined by the appended claims.

What is claimed is:

1. A method for normalizing the apparent water saturation condition of a subsurface formation determined from thermal neutron capture logs obtained during a log-inject-log operation in a borehole traversing the subsurface formation comprising the steps of:
    (a) measuring the macroscopic absorption cross sections of hydrocarbon in the formations surrounding said borehole,
    (b) determining the apparent macroscopic absorption cross section of a rock matrix in the formation surrounding the borehole from said apparent water saturation and said measured macroscopic absorption cross section of the hydrocarbon,
    (c) measuring the real macroscopic absorption cross section of the rock matrix,
    (d) determining a normalization factor relating to said apparent and measured macroscopic absorption cross sections for said rock matrix, and
    (e) applying said normalization factor to said apparent water saturation to correct for neutron diffusion and borehole effects on said thermal neutron capture logs.

2. The method of claim 1 wherein said normalization factor further includes a factor for correcting said apparent water saturation for linear deviation between the apparent and measured rock matrix cross sections.

3. A method for determining the fluid saturation condition of a subsurface formation comprising the steps of:
    (a) flushing said formation with a first fluid of known macroscopic absorption cross section ($\Sigma_{w1}$) and recording a first pulsed neutron capture log ($\Sigma_{log\ 1}$) of the flushed formation, (b) flushing said formation with a second fluid of known macroscopic absorption cross section ($\Sigma_{w2}$) and recording a second pulsed neutron capture log ($\Sigma_{log\ 2}$) of the flushed formation, (c) recording the porosity ($\phi$) of said subsurface formation, (d) determining apparent water saturation ($S_w$) in accordance with the following expression:

$$S_w = (\Sigma_{log\ 1} - \Sigma_{log\ 2})/\phi(\Sigma_{w1} - \Sigma_{w2}),$$

(e) measuring the macroscopic absorption cross sections for the hydrocarbon ($\Sigma_h$) and the rock matrix ($\Sigma_r^*$) of said subsurface formation, (f) determining the apparent macroscopic absorption cross section of the rock matrix ($\Sigma_r$) of said subsurface formation from said apparent water saturation ($\Sigma_w$) and said measured macroscopic absorption cross section of the hydrocarbon ($\Sigma_h$) in accordance with the following expression:

$$\Sigma_r = \Sigma_{log} - \phi[S_w \Sigma_w + \Sigma_h (1 - S_w)]/(1 - \phi),\ and$$

(g) correcting said apparent water saturation ($S_w$) with a normalization factor (k) relating said measured ($\Sigma_r^*$) and apparent ($\Sigma_r$) macroscopic absorption cross sections of the rock matrix in accordance with the following expression:

$$k = [\Sigma_r^*(1-\phi) + \Sigma_h \phi]/[\Sigma_r(1-\phi) + \Sigma_h \phi].$$

4. The method of claim 3 wherein said normalization factor (k) further includes a correction factor ($\Delta\Sigma$) for any zero offset effect between the apparent and measured rock matrix cross sections in accordance with the following expression:

$$k = [\Sigma_r^*(1-\phi) + \phi\Sigma_h - \Delta\Sigma]/[\Sigma_r(1-\phi) + \phi\Sigma_h].$$

5. A method for correcting pulsed thermal neutron capture logs of subsurface formations for neutron diffusion and borehole effects, comprising the steps of:

(a) measuring the porosity of said subsurface formation, (b) determining the apparent macroscopic absorption cross section of a rock matrix in said subsurface formation from said pulsed thermal neutron capture logs and said neutron capture logs and said porosity, (c) measuring the macroscopic absorption cross section of the rock matrix in said subsurface formation, and (d) correcting said pulsed thermal neutron capture logs in accordance with a normalization factor relating said apparent and measured macroscopic absorption cross sections of the rock matrix in said subsurface formation.

* * * * *